(12) United States Patent
McClure

(10) Patent No.: US 7,908,822 B2
(45) Date of Patent: Mar. 22, 2011

(54) COMPUTER CONTROLLED AUTOMATIC WRAPPING MATERIAL DISPENSING SYSTEM FOR A ROUND BALER

(75) Inventor: John R. McClure, New Holland, PA (US)

(73) Assignee: CNH America LLC, New Holland, PA (US)

( * ) Notice: Subject to any disclaimer, the term of this patent is extended or adjusted under 35 U.S.C. 154(b) by 33 days.

(21) Appl. No.: 12/152,555

(22) Filed: May 15, 2008

(65) Prior Publication Data

US 2009/0282788 A1 Nov. 19, 2009

(51) Int. Cl.
B65H 18/14 (2006.01)
B65B 57/02 (2006.01)

(52) U.S. Cl. ............ 53/52; 53/64; 53/389.2; 53/587; 242/535.1

(58) Field of Classification Search .......... 53/118, 53/587, 64, 52, 389.2, 389.3; 242/535.1, 242/412, 413, 413.1
See application file for complete search history.

(56) References Cited

U.S. PATENT DOCUMENTS

| | | | |
|---|---|---|---|
| 3,488,014 A | 1/1970 | Martin | 242/75.46 |
| 3,762,312 A * | 10/1973 | Guhl | 100/52 |
| 3,780,961 A * | 12/1973 | Kahwati et al. | 242/534.2 |
| 3,862,724 A | 1/1975 | Johnson et al. | 242/75.43 |
| 4,099,601 A | 7/1978 | Pittman | 188/163 |
| 4,366,665 A | 1/1983 | VanGinhoven et al. | 56/341 |
| 4,409,784 A | 10/1983 | VanGinhoven et al. | 56/341 |
| 4,597,254 A | 7/1986 | Bowden, Jr. | 56/341 |
| 4,610,123 A | 9/1986 | Krone et al. | 53/118 |
| 4,956,968 A | 9/1990 | Underhill | 56/341 |
| 5,054,263 A | 10/1991 | Maki-Rahkola | |
| 5,079,898 A | 1/1992 | Springs et al. | 53/399 |
| 5,243,806 A | 9/1993 | Jennings et al. | 53/118 |
| 5,289,672 A | 3/1994 | Underhill | |
| 5,327,821 A | 7/1994 | McClure et al. | 100/5 |
| 5,687,548 A | 11/1997 | McClure et al. | 53/399 |
| 6,425,228 B2 * | 7/2002 | Lancaster et al. | 53/588 |
| 6,453,805 B1 | 9/2002 | Viaud et al. | 100/31 |
| 6,823,646 B2 | 11/2004 | McClure et al. | 53/118 |
| 6,866,348 B2 * | 3/2005 | Ewel | 303/113.1 |
| 7,204,564 B2 * | 4/2007 | Brown et al. | 303/7 |
| 2002/0046552 A1 | 4/2002 | Huchet | |

FOREIGN PATENT DOCUMENTS

DE 3634571 4/1998
WO WO2009010524 1/2009

* cited by examiner

Primary Examiner — Rinaldi I. Rada
Assistant Examiner — John Paradiso
(74) Attorney, Agent, or Firm — Patrick M. Sheldrake; Michael G. Harms

(57) ABSTRACT

A wrapping material dispensing system for a round baler which automatically and precisely controls the tension in the wrapping material by controlling the braking force applied to the rotation of a wrapping material roll according to a braking profile. The profile is a function of the discrete phases of wrapping the material about the bale, and at least one characteristic of the wrapping material on the wrapping material roll.

23 Claims, 11 Drawing Sheets

COMPUTER CONTROLLED AUTOMATIC WRAPPING MATERIAL DISPENSING SYSTEM FOR A ROUND BALER

TECHNICAL FIELD

This invention relates to round balers that include a bale wrapping apparatus for wrapping a harvested crop material with a wrapping material, such as net, twine, stretch film or plastic film, to produce geometrically-shaped bales of the harvested crop material for convenient transport and storage. More particularly, the present invention relates to a bale wrapping apparatus and method including a computer controlled brake that automatically and precisely controls the tension exerted on the wrapping material in a predetermined or controlled manner for placing the wrapping material around a round bale.

BACKGROUND ART

Agricultural round balers have been used for several decades to collect and bind crop material so as to facilitate the storage of crop material for later use. Generally, a mower or mower-conditioner cuts the crop and arranges it in a windrow for drying. Later, an agricultural tractor pulls a baler over the windrow to collect the crop material. The baler's windrow pickup gathers the cut and windrowed crop and lifts it into the baling chamber. The baling chamber consists of a pair of opposing sidewalls with a series of belts that rotate and compress the crop material into a cylindrically shaped bale. When the bale has achieved a desired size and density, the operator wraps the bale to ensure that the cylindrical and compact nature of the bale is maintained. There are many wrapping materials and methods of wrapping the bale depending on a variety of factors. After the bale is bound or wrapped, it is ejected from the baler for later pickup by the farmer.

Generally, round balers are pulled by an agricultural tractor and receive rotational power from the tractor's power-take-off shaft positioned at the rear of the tractor. The energy is transmitted to a gearbox positioned on the baler. Some balers also use a hydraulic motor and pump arrangement to provide energy to the various baler elements such as the various rollers and belts. As previously mentioned, balers often use net, twine, stretch film, plastic film, or other wrapping materials to wrap, and thereby confine and protect, bales of forage immediately after bale formation while the bales are still within the baler. In particular, conventional balers typically incorporate rolls of wrapping material rotatably supported by a wrapping material roll. An automated wrapping assembly feeds the wrapping material into the baling chamber where it is unwound from the roll to be wrapped around the exterior portion of the bale as the bale rotates in the baling chamber. The flow of wrapping material into the baling chamber is controlled by the rotation of the bale in the baling chamber, and the tension in the wrapping material is controlled by a brake device supplying an opposing drag force to the wrapping material roll.

The tension in the wrapping material is very important when wrapping the bale. For example, if the tension is too high, the wrapping material may not attach to the bale when entering the baling chamber. Or, once attached, it may tear and/or recoil from the baling chamber. If the tension is too low, the wrapping material will not spread properly along the length of the bale in a tight wrap. Insufficient tension during severing may leave a jagged edge or stringers at the end of the wrapping material that may catch on equipment, or the like, and cause the bale to unwrap. Accordingly, precise control over the tension in the wrapping material is desirable.

A brake device supplying an opposing drag force to the wrapping material roll provides the tension in the wrapping material when wrapping a bale. At the beginning of the wrapping process, little or no braking force is required to allow the wrapping material roll to begin rotation and feed wrapping material to the bale. As the wrapping material enters the baling chamber and catches on the bale, an increased braking force is required to increase tension so the wrapping material will spread along the entire bale while the wrapping. Increasing the tension too quickly or by too much may cause the wrapping material to tear and/or recoil from the baling chamber. Once the bale is wrapped, a braking force is required to create tension in the wrapping material to facilitate a clean cut.

The required increase in tension in the wrapping material remains consistent from bale to bale, however, the braking force required to achieve a particular tension may vary based on wrapping material characteristics. For example, each wrapping material, such as twine, black net, white net, stretch film, plastic film, and the like, requires a different braking force to provide a similar amount of tension in the wrapping material. Also, as wrapping material is used, the braking force required to produce a particular tension in the wrapping material decreases as the amount of wrapping material on the roll decreases.

Present systems typically use mechanical brake mechanisms to apply a level of braking force in an "on" or "off" manner. These mechanisms are usually manually adjusted for each type of wrapping material. They also must be adjusted for the diameter of the roll of wrapping material. The proper adjustment may be difficult to determine without trial and error, resulting in possible tearing, recoil, poor spread, poor cut, or bunching of the wrapping material. These mechanisms are also typically complicated to adjust resulting in frustration and lost time for the operator.

Thus, what is sought is a bale wrapping apparatus and method including a computer controlled brake device that automatically and precisely controls the tension exerted on the wrapping material in a predetermined or controlled manner for placing the wrapping material around a round bale which overcomes at least one of the problems, shortcomings or disadvantages set forth above.

SUMMARY OF THE INVENTION

What is disclosed is a bale wrapping apparatus and method including a computer controlled brake device that automatically and precisely controls the tension exerted on the wrapping material in a predetermined or controlled manner for placing the wrapping material around a round bale which overcomes at least one of the problems, shortcomings or disadvantages set forth above.

Agricultural round balers are typically pulled over a windrow of cut crop material to gather the crop, form it into a cylindrically shaped bale, and eject the bale from the rear of the baler. To secure and protect the bale from the elements, balers often include a wrapping assembly to cover the bale with a wrapping material such as twine, net, stretch film, plastic film, or the like.

According to the present invention, an adjustable force wrapping material dispensing system for an agricultural baler allow precise control of the tension in the wrapping material. Wrapping material is supplied from a wrapping material roll that is rotatably supported on a wrapping material roll mount. The system includes a brake device configured and controllably operable for applying a braking force for controlling the rotation of the wrapping material roll as wrapping material is dispensed therefrom for wrapping the material about a bale of cut plant material produced by the baler. Wrapping of the plant material includes discrete wrapping phases of delivering the wrapping material to the bale, engaging the wrapping material with the bale, and wrapping the wrapping material about the bale. A controller connected in operative control of the brake device automatically controls the braking force applied by the brake device to different predetermined levels according to a braking force profile. The different levels are functions of the discrete wrapping phases and will be applied during the phases, respectively, and of at least one characteristic of the wrapping material on the wrapping material roll.

Characteristics of the wrapping material roll may include the type of material and the amount of wrapping material on the roll, and the like, and they may be input at an input device, sensed or determined.

According to a preferred aspect of the invention, the braking force profile comprises at least a first braking force level, to be applied during the discrete phase of delivering the wrapping material to the bale; a second braking force increasing from the first braking force level to a third braking force level greater than the first braking force level, to be applied during the discrete phase of engaging the wrapping material with the bale; and the third braking force level, to be applied during the discrete phase of wrapping the wrapping material about the bale.

According to another aspect of the invention, the discrete wrapping phases further include a phase of severing the wrapping material from the wrapping material roll, and the braking force profile further comprises a fourth braking force level to be applied during the phase of severing the wrapping material from the wrapping material roll.

According to yet another aspect of the invention, the predetermined levels comprise at least a first level wherein a tension in the wrapping material is at a first value; a second level wherein the tension is gradually increased from the first value to a second value greater than the first value, and a third level wherein the tension is generally held at the second value.

According to a preferred embodiment of the method for wrapping a bale of cut plant material formed in a rotating baling chamber of an agricultural round baler includes providing a roll of wrapping material rotatably mounted on a wrapping material roll mount associated with the baler. Wrapping material is delivered to the baling chamber, and substantially free rotation of the wrapping material roll is allowed for facilitating the initial engagement of the wrapping material with the bale. As the wrapping material begins to wrap around the bale, rotation of the wrapping material roll is automatically opposed according to a first predetermined profile wherein opposing the rotation increases a tension in the wrapping material to a first predetermined level. As the wrapping material wraps the bale, the tension in the wrapping material at the first predetermined level is maintained. The first predetermined profile and the first predetermined level are a function of at least one characteristic of the wrapping material wrapping the bale.

Another aspect of the method of the invention includes automatically opposing the rotation of the wrapping material roll according to a second predetermined profile to a second predetermined level, as the wrapping material is severed from the wrapping material roll. Again the second predetermined profile and second predetermined level is a function of at least one characteristic of the wrapping material.

According to yet another aspect of the invention, a plurality of the braking force profiles associated with a plurality of the wrapping material characteristics are stored in a memory device. The controller is operable to automatically access the memory device and select the braking force profile from the plurality of stored braking force profiles based on the at least one wrapping material characteristic.

According to yet another aspect of the invention, the braking force profile and/or level of braking force may be adjusted by an operator.

Preferred apparatus for the controlling the rotation of the wrapping material roll mount include a microprocessor based controller in communication with a torque resistor such as an electric brake, an electromagnetic motor, or a hydraulic brake attached to the roll mount. Preferred apparatus for identifying the at least one wrapping material characteristic include a sensor in communication with the controller or an input device connected to the controller.

DETAILED DESCRIPTION OF THE INVENTION

Figure 1:
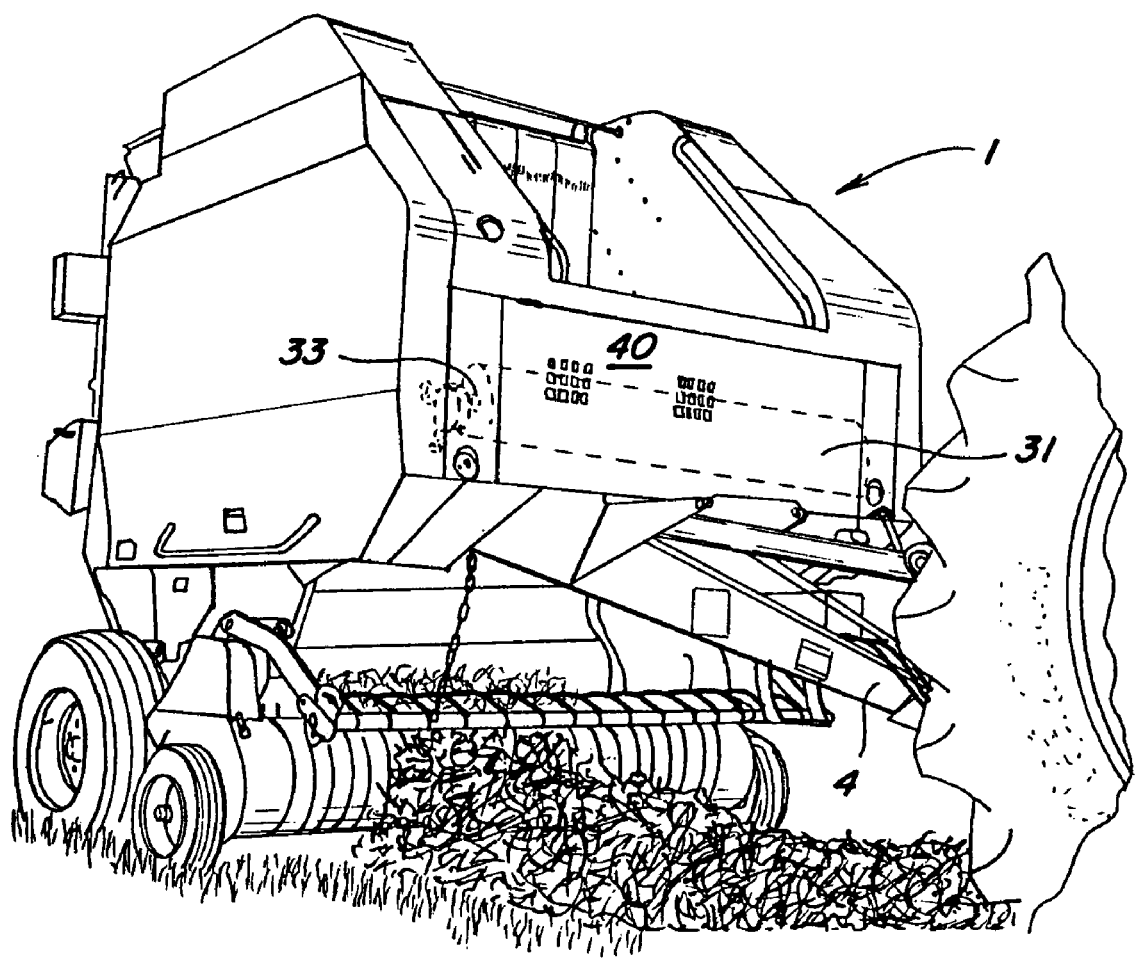
FIG. 1 is a representative round baler attached to a the rear of a tractor.
Figure 2:
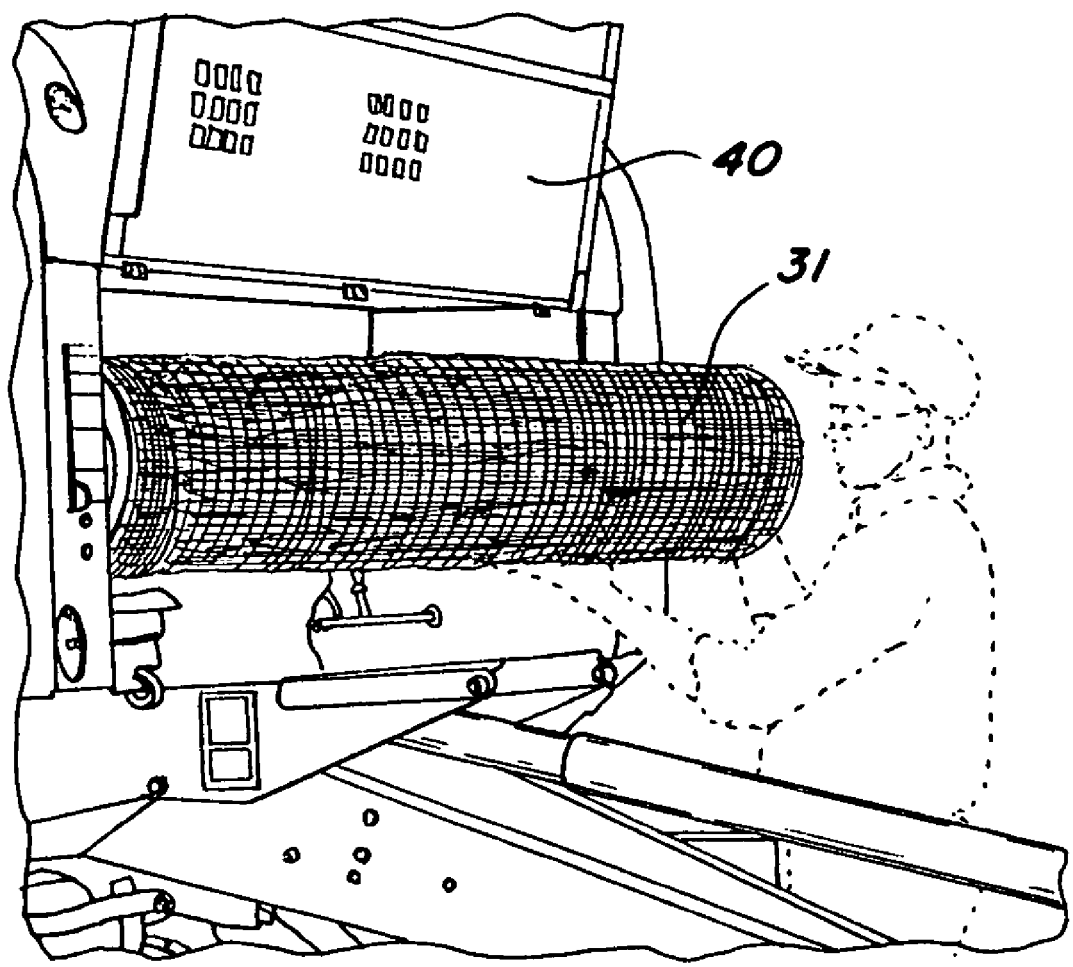
FIG. 2 is a cut-away view of the round baler showing an operator installing a roll of wrapping material on the round baler.
Figure 3:
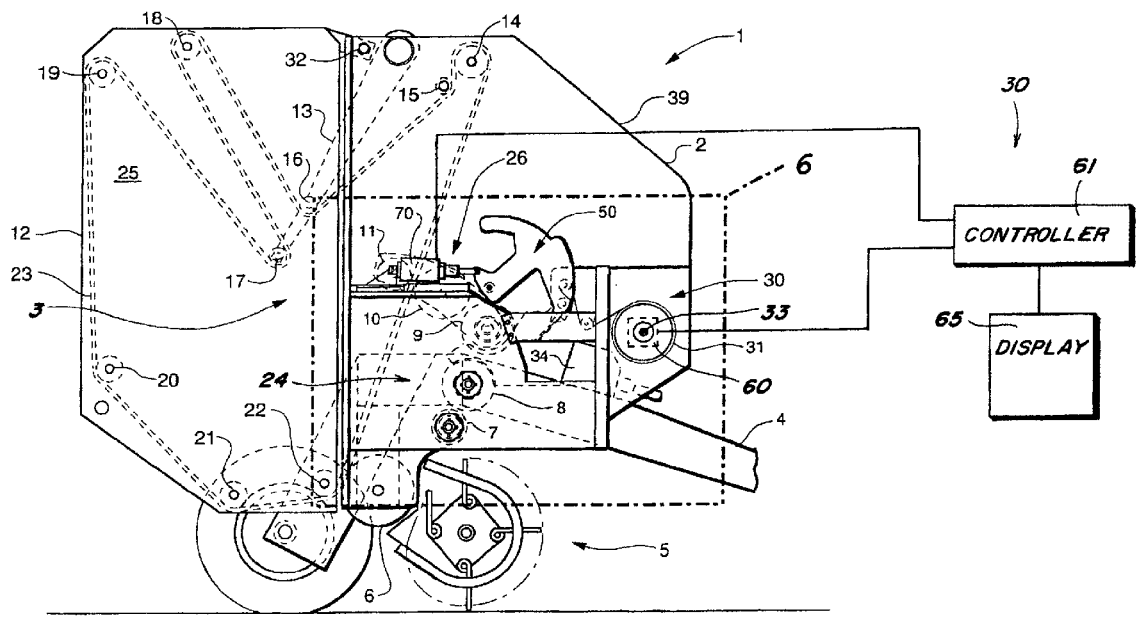
FIG. 3 is a side elevation view of the round baler in communication with a controller shown with an empty baling chamber and a wrapping material dispenser system in its home position.

The preferred embodiments of the invention will now be described with reference to a round baler that produces a round bale having a cylindrical shape. However, one skilled in the art would appreciate that the present invention can be practiced on balers that produce rectangular bales and can be practiced by round balers having a fixed or variable bale-forming chamber. FIG. 1 illustrates a conventional round baler 1 attached to a tractor or other work vehicle (not fully shown) by means of a tongue 4. A wrapping material roll 31 rotatably mounted on a wrapping material roll mount 33 is depicted in phantom behind a panel 40 of baler 1. FIG. 2 shows panel 40 open with an operator installing wrapping material roll 31. Rotational power from the tractor's power-take-off shaft (not shown) is transmitted to a gearbox 34 via a drive shaft (FIG. 3). This is the source of power to operate baler 1. It is also possible that a hydraulic motor and pump arrangement may be used.

With reference to FIG. 3, round baler 1 has a main frame 2 supported by a pair of tires (only one shown). A pickup 5 is positioned to gather crop material as baler 1 moves through the field. Baling chamber 24 is defined by a pair of opposing baling chamber sidewalls 3 and a series of rubber belts defining an apron 23. Further defining baling chamber 24 is a floor roll 6, a starter roll 7, a fixed roll 8, and a sledge assembly 26 that includes a pivot roll 9, a stripper roll 10 and a follower roll 11. Baling chamber 24 has a tailgate 12 that pivots about a tailgate pivot 32 to allow tailgate 12 to separate from a front portion 39 of baler 1.

Apron 23 includes a series of rubber belts that encircles follower roll 11, a drive roll 14, a backwrap roll 15, a front serpentine roll 16, a rear serpentine roll 17, a top/front tailgate idler roll 18, a top/rear tailgate idler roll middle tailgate idler roll 19, a middle tailgate idler roll 20, a bottom tailgate idler roll 21, and a nose roll 22. The length of apron 23 is adjusted by a pivoting serpentine take up arm 13. Serpentine take up arm 13 rotates clock wise from its position in FIG. 3 when baling chamber 24 is empty to its position in FIG. 4 when baling chamber 24 is full as crop material enters baling chamber 24.

Figure 4:
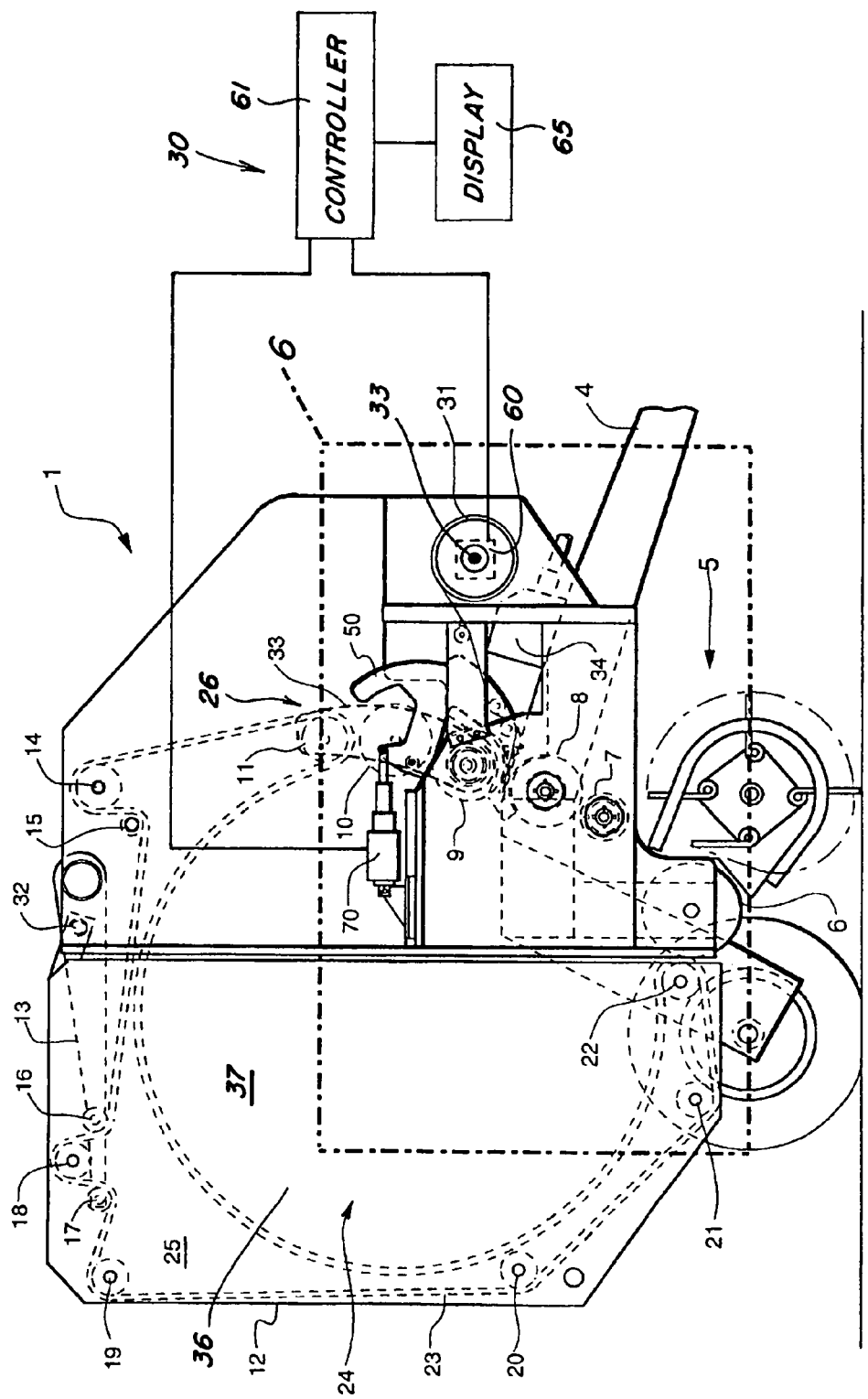
FIG. 4 is a side elevation view of the round baler in communication with the controller shown with a full baling chamber and the wrapping material dispenser positioned to insert wrapping material in the baling chamber.
Figure 5:
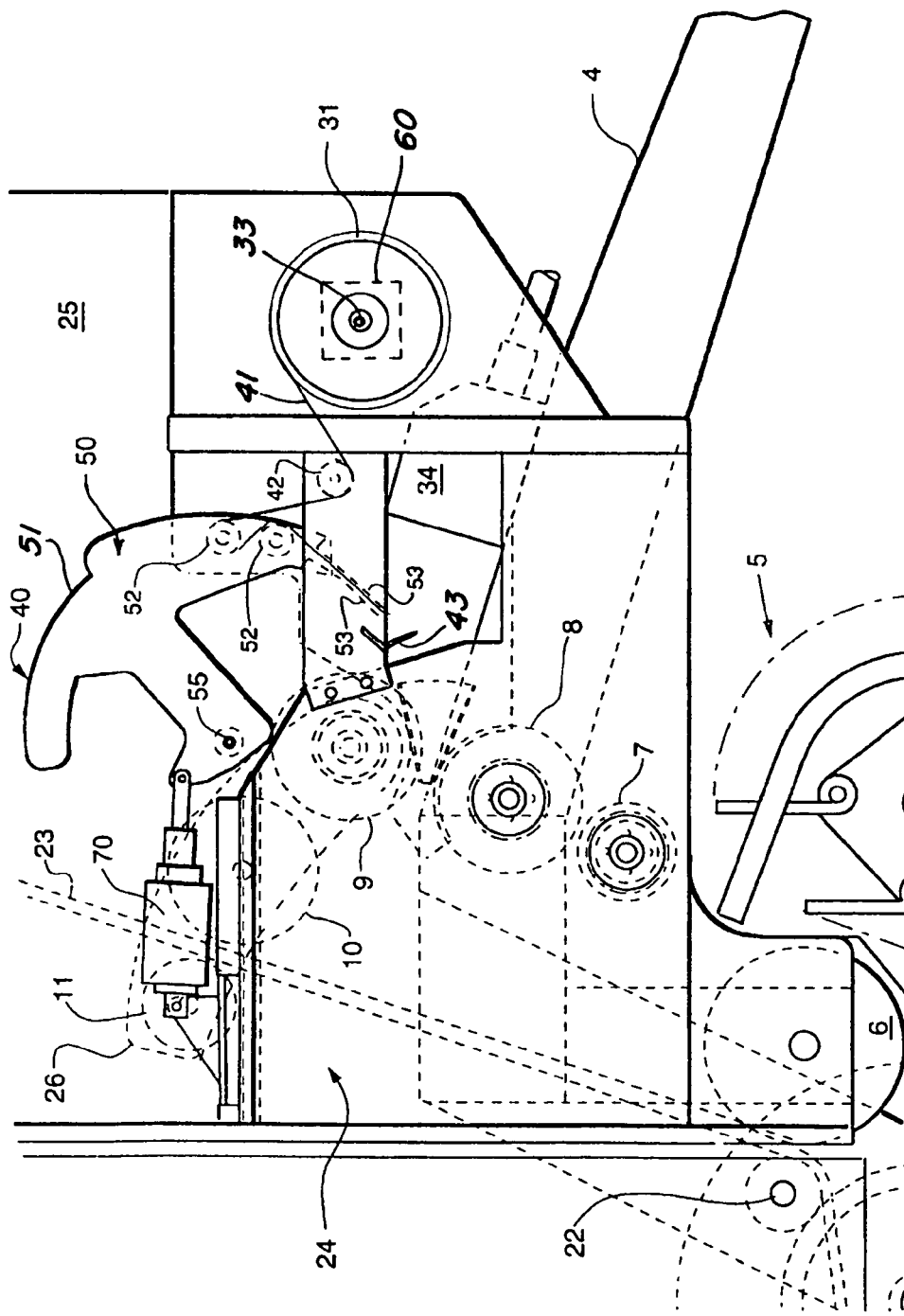
FIG. 5 is an enlarged elevation of the area of "5" of FIG. 3 showing the wrapping material dispensing system in the home position when the baling chamber is empty.
Figure 6:
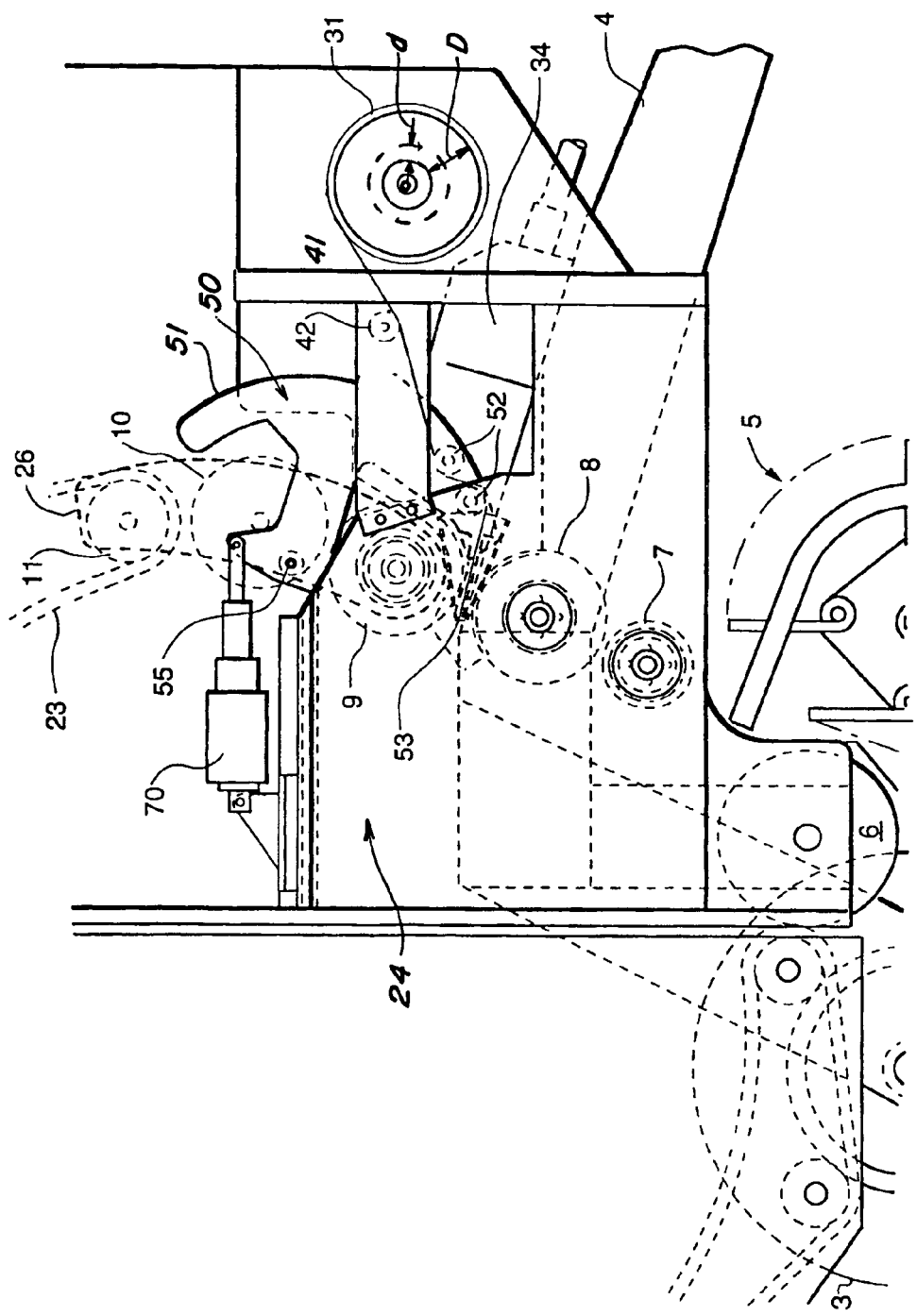
FIG. 6 is an enlarged elevation of the area "6" of FIG. 4 showing the wrapping material dispensing system positioned to insert wrapping material in the baling chamber when the baling chamber is full.

With reference to FIGS. 3 and 4, to create a bale 36 from cut crop material, the tractor pulls baler 1 over a windrow of previously cut crop material. Pickup 5 guides the crop material between floor roll 6 and starter roll 7 into baling chamber 24. As more crop material enters baling chamber 24, serpentine take up arm 13 and sledge assembly 26 rotate clockwise from their positions shown in FIG. 3 to allow additional crop material to enter baling chamber 24 while ensuring that proper pressure is maintained on bale 36. When bale chamber 24 is full, a wrapping material delivery assembly 50, as shown in FIGS. 5 and 6, delivers wrapping material 41 from wrapping material roll 31 to bale 36, thereby wrapping bale 36 as it turns in baling chamber 24. Once bale 36 is wrapped, wrapping material 41 is severed from roll 31, and bale 36 is ejected from baling chamber 24 and away from round baler 1 and the tractor.

Wrapping material delivery assembly 50 has a pair of arms 51 positioned outside of baling chamber sidewalls 3. Arms 51 are attached at a pivot 55 on sidewalls 3. Connecting arms 51 is an assembly frame that includes a pair of baffles 53 forming a duck bill that clamp or grip wrapping material 41. Wrapping material 41 is dispensed from wrapping material roll 31, to spreader roller 42, to spreader rolls 52, and to baffles 53. Also associated with arms 51 is a knife or severing device 43. Wrapping material delivery assembly 50, controlled by an actuator 70 attached to one of arms 51, is rotated about pivot 55 between the positions shown in FIGS. 5 and 6 during the wrapping process.

When not wrapping bale 36, wrapping material delivery assembly 50 is in its home or retracted position as seen in FIGS. 3 and 5. At the start of the wrapping process, actuator 70 is extended, rotating wrapping material delivery assembly 50 clockwise as seen in FIGS. 4 and 6. During this rotation, baffle pair 53 aligns wrapping material 41 for entry into baling chamber 24 between fixed roll 8 and pivot roll 9. Once wrapping material 41 enters baling chamber 24, baffle pair 53 releases its grip allowing wrapping material 41 to be pulled by the rotation in baling chamber 24. Wrapping material 41 engages bale 36 as bale 36 rotates within baling chamber 24. Once engaged the rotation of bale 36 pulls wrapping material 41 and rotating wrapping material roll 31. As wrapping material 41 wraps bale 36, actuator 70 retracts, rotating wrapping material delivery system 50 counterclockwise, from its position in FIGS. 4 and 6, to its position in FIGS. 3 and 5. Once sufficient wrapping material has covered bale 36, the severing device 43 severs wrapping material 41 from wrapping material roll 31.

Figure 7:
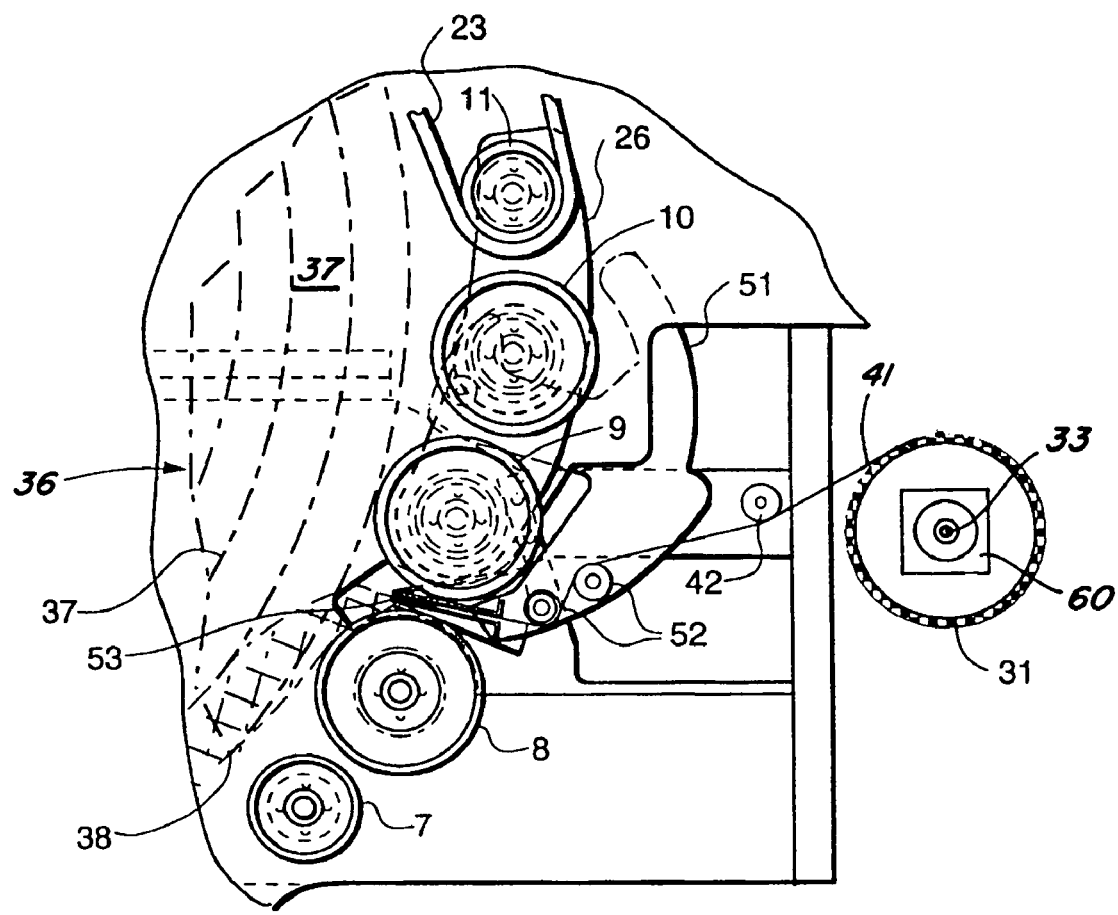
FIG. 7 is an enlarged view of a portion of the wrapping material system shown in FIG. 6.

As mentioned above, the tension required in wrapping material 41 varies during discrete phases of a wrapping process. The braking force required to obtain the required tension also varies in proportion to the amount of wrapping material 41 remaining on wrapping material roll 31 and with the type of wrapping material 41, such as twine, black net, white net, stretch film, plastic film, or the like. A tight and even supply of wrapping material 41 is important to create a tight wrap spread along bale 36 having a clean cut surface. This is especially important when extending wrapping material 41 over outside edges 37 (FIG. 7) of bale 36 to protect and maintain the bale's shape.

Figure 10:
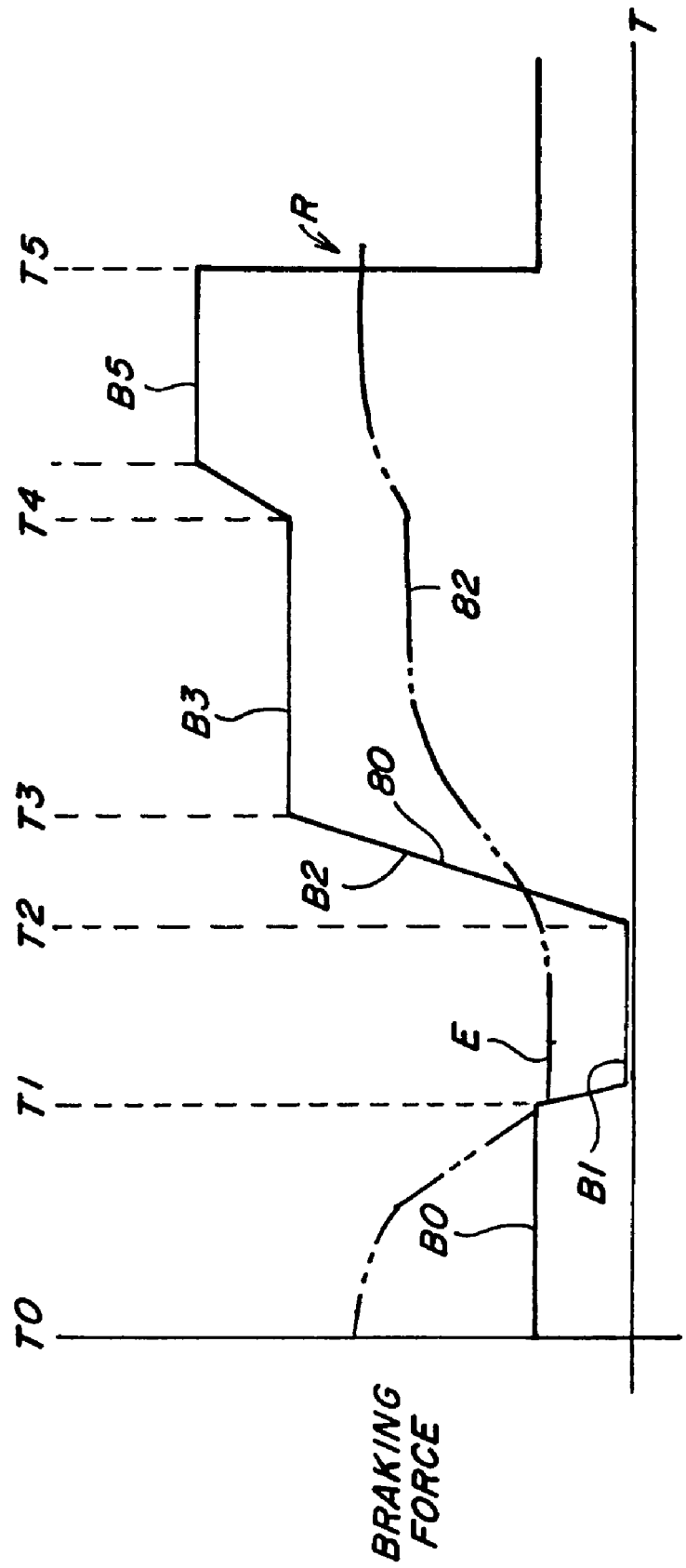
FIG. 10 is a possible representative force versus time braking force profile of the present invention for a particular type of wrapping material.
Figure 11:
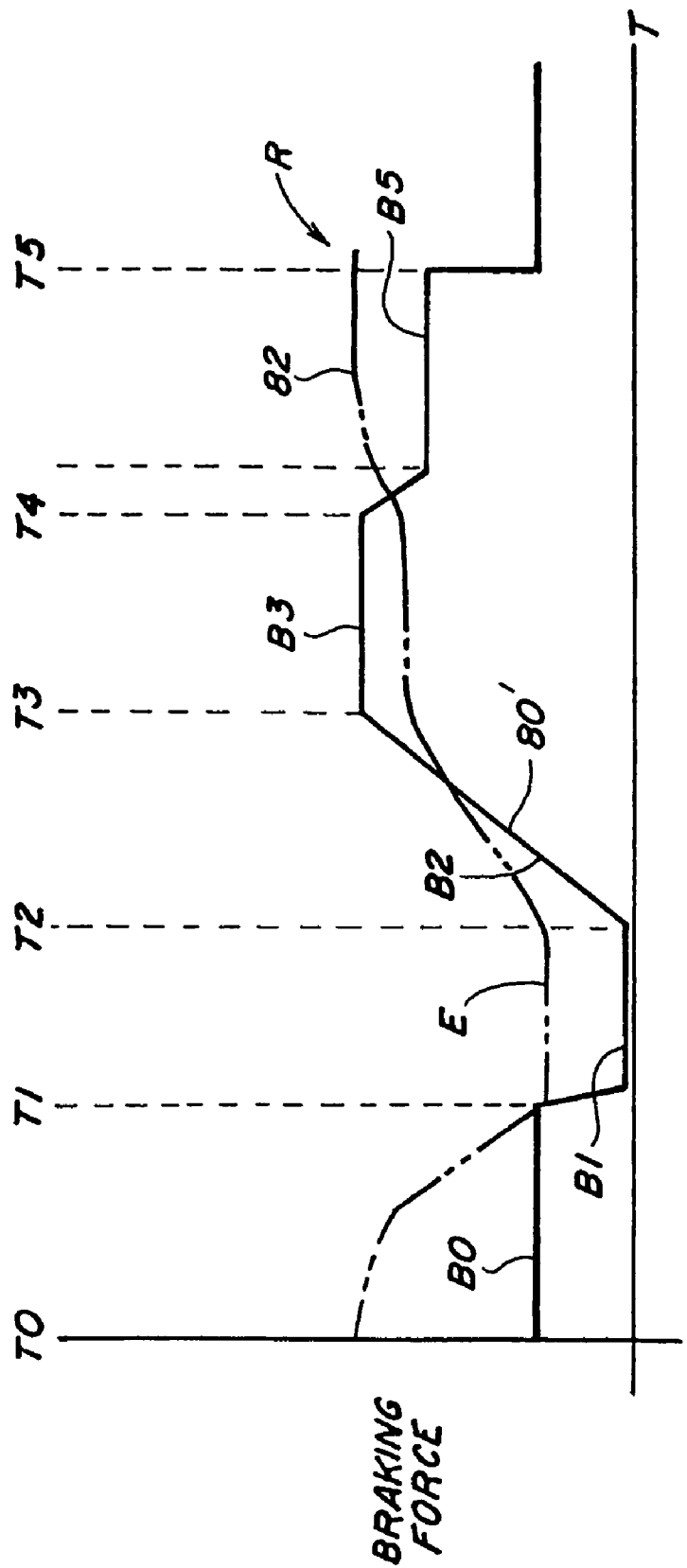
FIG. 11 is another possible representative force versus time braking force profile of the present invention for a different wrapping material.
Figure 12:
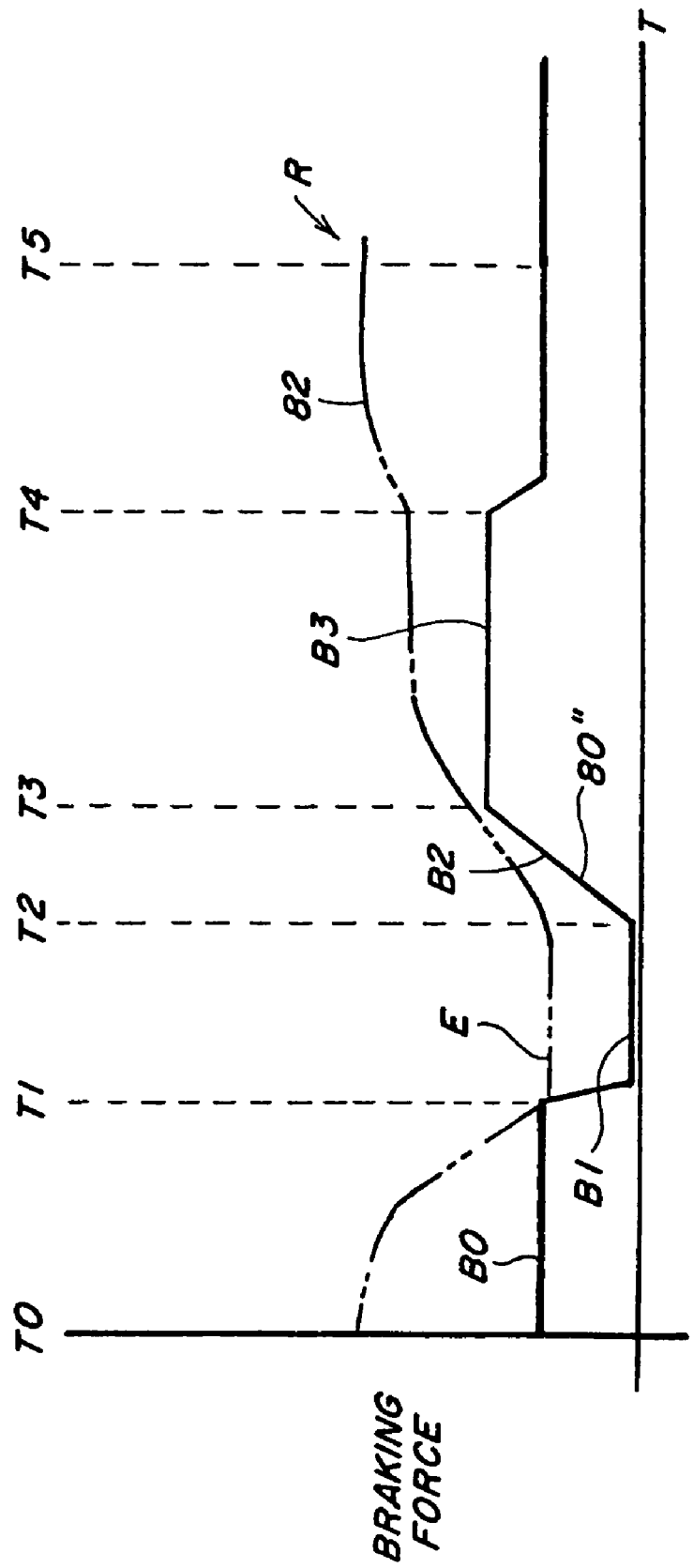
FIG. 12 is yet another possible representative force versus time braking force profile of the present invention for yet another type of wrapping material.

According to the present invention, the tension in wrapping material 41 is precisely and automatically controlled by a brake device 60. As can be seen in FIGS. 3-7, a wrapping material dispensing system 30 comprises wrapping material roll mount 33 rotatably supporting wrapping material roll 31, and a brake device 60. Brake device 60 is configured and controllably operable for applying a braking force for controlling the rotation of wrapping material roll 31 as wrapping material 41 is dispensed therefrom for wrapping the material about bale 36 of cut plant material produced by baler 1. Wrapping of the material includes discrete wrapping phases of delivering wrapping material 41 to bale 36, engaging wrapping material 41 with bale 36, and wrapping wrapping material 41 about bale 36. In addition, a controller 61 is connected in operative control of brake device 60 and is automatically operable for controlling the braking force applied by brake device 60 to different predetermined levels according to a braking force profile 80, examples of which are seen in FIGS. 10, 11, and 12. The different levels of braking force profile 80 are functions of the discrete wrapping phases and will be applied during the phases, respectively. Braking force profile 80 is also a function of at least one characteristic of wrapping material 41 on wrapping material roll 31.

Braking force profile 80 comprises at least a first braking force level, to be applied during the discrete phase of delivering wrapping material 41 to bale 36; a second braking force increasing from the first braking force level to a third braking force level greater than the first braking force level, to be applied during the discrete phase of engaging wrapping material 41 with bale 36; and the third braking force level, to be applied during the discrete phase of wrapping material 41 about bale 36.

According to another aspect of the invention, the discrete wrapping phases further include a phase of severing wrapping material 41 from wrapping material roll 31. Braking force profile 80 further comprises a fourth braking force level, to be applied during the phase of severing wrapping material 41 from wrapping material roll 31.

According to yet another aspect of the invention, the predetermined levels of braking force profile 80 comprise at least a first level wherein a tension in wrapping material 41 is at a first value; a second level wherein the tension is gradually increased from the first value to a second value greater than the first value, and a third level wherein the tension is generally held at the second value. Again the discrete wrapping phases may further include a phase of severing wrapping material 41 from wrapping material roll 31. Correspondingly, predetermined levels may further include a fourth level to be applied during the phase of severing wrapping material 41.

According to a preferred method for wrapping bale 36 of cut plant material formed in rotating baling chamber 24 of agricultural round baler 1 wrapping material roll 31 is provided rotatably mounted on wrapping material roll mount 33 associated with baler 1. Wrapping material 41 is delivered to baling chamber 24 and wrapping material roll 31 is allowed substantially free rotation for facilitating initial engagement of wrapping material 41 with bale 36. As wrapping material 41 begins to wrap about bale 36, the rotation of wrapping material roll 41 is automatically opposed according to a first predetermined profile wherein opposing the rotation increases tension in wrapping material 41 to a first predetermined level. As wrapping material 41 wraps bale 36, tension is maintained in wrapping material 41 at the first predetermined level. The first predetermined profile and the first predetermined level are a function of at least one characteristic of the wrapping material.

According to another aspect of the method, as wrapping material 41 is severed from wrapping material roll 31, rotation of wrapping material roll 31 is automatically opposed according to a second predetermined profile to a second predetermined level. Again the second predetermined profile and second predetermined level are functions of at least one characteristic of the wrapping material.

By way of example, FIGS. 10, 11 and 12 are plots of possible representative braking force versus time profile 80, 80' and 80" for different wrapping materials. These profiles are overlaid with an actuator position profile 82. Each plot is specific to a particular type of wrapping material 41 and a particular amount of wrapping material 41 remaining on wrapping material roll 31. Turning now to FIGS. 10, 11 and 12, prior to time T0, bale 36 is forming in baling chamber 24 and actuator 70 is in its retracted position denoted R. At time T0, controller 61 initiates the discrete phases of wrapping material about bale 36. Actuator 70 moves to its extended position denoted E, thus rotating wrapping material delivery assembly 50 to align wrapping material 41 for entry into baling chamber 24. At time T1, when actuator 70 is fully extended, wrapping material 41 is delivered to baling chamber 24. The rotation of bale 36 pulls wrapping material 41 initiating rotation of wrapping material roll 31.

At time T1, a first braking force level B1 is applied to wrapping material roll 31. Braking force B1 is small or zero to allow substantially free rotation of roll 31 for facilitating initial engagement of wrapping material 41 with bale 36. Once wrapping material 41 has engaged and begins to wrap bale 36, at time T2, a second braking force denoted B2 is applied to wrapping material roll 31. B2 increases from B1 to a third braking force level B3, increasing the tension in wrapping material 41. When the desired tension is reached at time T3, braking force B3 is held constant while wrapping material 41 wraps bale 36. Comparing B2 and B3 of braking force profiles 80, 80' and 80" indicates the variation necessary when dealing with different wrapping materials. The slope of B2 represents balancing the need to increase the tension in wrapping material 41 as quickly as possible without tearing. Prior systems used an "on" or "off" braking device with no capability to precisely control or vary the rate at which the tension was increased in wrapping material 41. B3 also varies with the type of wrapping material 41, and prior systems required manual adjustment to vary this level.

Note, during the engagement and wrapping of bale 36, or in other words, as braking force is increased along B2 and held constant at B3, actuator 70 is retracting and positioning the severing mechanism between baffle pair 53 and baling chamber 24. At time T4, when actuator 70 is almost fully retracted, and bale 36 is fully wrapped, baffle pair 53 clamps wrapping material 41, and braking force is adjusted from B3 to a braking force level B5. At time T5 braking force level B5 is maintained to hold tension in wrapping material 41 while actuator 70 fully retracts bringing severing device 43 in contact with wrapping material 41 and severing wrapping material 41 from wrapping material roll 31. Depending on the type of wrapping material, B5 may be greater than, less than, or possibly equal to B3.

According to another aspect of the invention, the operator is allowed to select or modify braking force profiles and/or braking forces levels during operation.

Characteristics of wrapping material 41 include, but are not limited to, the type of wrapping material 41 and the amount wrapping material 41 remaining on wrapping material roll 31. These characteristics may be input at an interactive operator display 65, as shown in FIGS. 3 and 4, sensed by a sensing apparatus (not shown) or determined in some other appropriate method.

With reference to FIG. 6, one skilled in the art would appreciate that for rotation that provides a steady stream of wrapping material 41, a full wrapping material roll 31 represented by diameter D, requires a maximum braking force, and as the diameter of wrapping material roll 31 decreases during wrapping operations, represented by diameter d, required braking force decreases proportionally. In one embodiment of the invention, this variation of required force is incorporated into the force versus time profile.

In yet another preferred embodiment of the invention, a plurality of the braking force profiles associated with a plurality of the wrapping material characteristics, respectively, is stored in a memory device. These profiles can be associated with characteristics such as the type of wrapping material, amount of material on the roll, and the like. These profiles can be selected by the operator via interactive display 65, or controller 61 can automatically access the memory device and select an appropriate braking force profile based on present wrapping material characteristics as sensed or determined.

Figure 8:
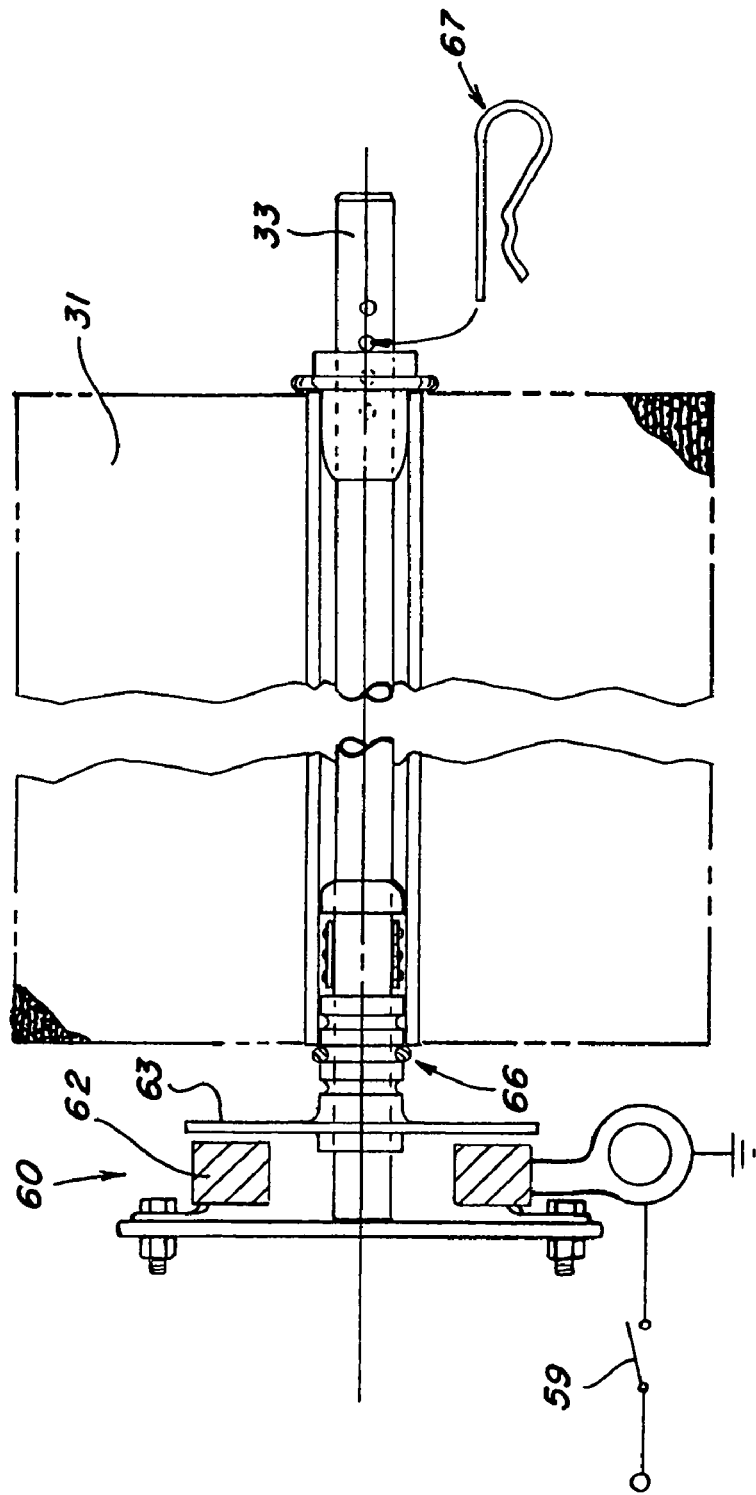
FIG. 8 is a representative electric brake as used in the present invention.
Figure 9:
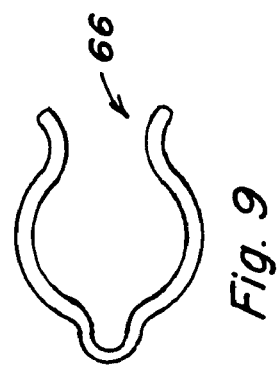
FIG. 9 is an elevated side view of the width adjustment clip used in mounting the wrapping material roll.

As represented in FIG. 8, brake device 60 may be realized by an electric brake. In a preferred embodiment, it is mounted on wrapping material roll mount 33 and controlled by controller 61. Power is supplied to electric brake 60 at a switch 59 to supply current to a magnet 63 in communication with an armature 62 to set a resistance of rotation of wrapping material roll 31 in response to controller 61 according to stored or programmed braking profiles. FIG. 9 is a side view of a width adjustment clip 66 as seen in FIG. 8. Together with a second clip 67, various widths of wrapping material may be mounted on wrapping material roll mount 33 for use with the present invention.

As a result of automatically controlling the braking force applied at wrapping material roll 31 by electric brake 60 or the like, several advantages may be realized. Various profiles for braking force based on type of wrapping material and the amount of wrapping material remaining diameter on the wrapping material roll are available to the operator without the need for complex mechanical adjustments. In addition, the operator will have improved control for wrapping material starting, spreading, cutting, and the like because tension in the material may be customized as required by the material. Finally, because the electric brake is less complicated than the present spring tension systems, assembly time will be reduced.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. An adjustable force wrapping material dispensing system for an agricultural baler, comprising:
    a wrapping material roll mount rotatably supporting a wrapping material roll;
    a brake device configured and controllably operable for applying a braking force for controlling the rotation of the wrapping material roll as wrapping material is dispensed therefrom for wrapping the material about a bale of cut plant material produced by the baler; and
    an electronic controller connected in operative control of the brake device, the controller configured for controlling the braking force applied by the brake device to different predetermined levels according to a braking force profile upon the initiation of a wrapping cycle, wherein the different levels are functions of discrete wrapping phases of the cycle, the phases including delivering the wrapping material to the bale, engaging the wrapping material with the bale, and wrapping the wrapping material about the bale respectively, and the type of wrapping material, wherein the controller is configured to receive a signal representative of the type of wrapping material from an operator input device or from a sensor.

2. The system of claim 1, wherein the controller is configured such that the maximum braking force applied by the braking device and a rate of increase of the braking force of the braking force profile applied during the wrapping cycle are determined as a function of the type of wrapping material.

3. The system of claim 2, wherein the different levels are also determined as a function of an amount of the wrapping material on the wrapping material roll.

4. The system of claim 1, wherein the braking force profile comprises at least a first braking force level, to be applied during the discrete phase of delivering the wrapping material to the bale;
    a second braking force increasing from the first braking force level toward a third braking force level greater than the first braking force level, to be applied during the discrete phase of engaging the wrapping material with the bale as a wrapping material delivery device is moved from a material insertion position to a wrapping position, wherein the controller determines the speed at which the second braking force increases as a function of the type of wrapping material; and
    the third braking force level, to be applied during the discrete phase of wrapping the wrapping material about the bale.

5. The system of claim 4, wherein the discrete wrapping phases further include a phase of severing the wrapping material from the wrapping material roll and wherein the braking force profile further comprises a predetermined braking force level, to be applied as the wrapping material delivery device is moved from the wrapping position to a severing position during the phase of severing the wrapping material from the wrapping material roll.

6. The system of claim 1, wherein the predetermined levels comprise at least a first level wherein a tension in the wrapping material is at a first value; a second level wherein the tension is gradually increased from the first value to a second value greater than the first value, and a third level wherein the tension is generally held at the second value, wherein the duration of time over which tension increases on the wrapping material during the second level is determined at least as a function of the type of wrapping material.

7. The system of claim 6, wherein the discrete wrapping phases further include a phase of severing the wrapping material from the wrapping material roll and wherein the predetermined levels further include a fourth level determined independently of the third level to be applied during the phase of severing the wrapping material when the wrapping material delivery device is moved from the wrapping position to a severing position.

8. The system of claim 1, wherein the at least one wrapping material characteristic comprises an input from an operator input display device connected to the controller, wherein the controller selects the brake force profile as a function of the input from the device.

9. The system of claim 1, wherein the controller is configured to increase the braking forces while a wrapping insertion mechanism configured for delivering wrapping material to a baling chamber is located at multiple positions within a wrapping cycle.

10. The system of claim 1, wherein the controller is configured to receive a signal from at least one sensor representative of the type of the at least one wrapping material selected.

11. The system of claim 1, wherein a plurality of the braking force profiles associated with a plurality of the wrapping material characteristics, respectively, are stored in a memory device.

12. The system of claim 11, wherein the controller is operable to automatically access the memory device and select the braking force profile from the plurality of stored braking force profiles based on the at least one characteristic of the wrapping material.

13. The system of claim 1, wherein the wrapping material is selected from the group consisting of net, twine, stretch film, and plastic film.

14. The system of claim 1, wherein the brake device comprises an electric brake.

15. The system of claim 1, wherein the brake device comprises an electromagnetic motor.

16. The system of claim 1, wherein the brake device comprises a torque resisting device.

17. The system of claim 1, wherein the braking force profile is adjustable by an operator input.

18. A method for wrapping a bale of cut plant material formed in a rotating baling chamber of an agricultural round baler comprising the steps of:
    providing a roll of wrapping material rotatably mounted on a wrapping material roll mount associated with the baler;
    delivering wrapping material to the baling chamber and allowing substantially free rotation of the wrapping material roll for facilitating initial engagement of the wrapping material with the bale;
    automatically opposing the rotation of the wrapping material roll according to a first predetermined profile as the wrapping material begins to wrap about the bale, wherein opposing the rotation increases a tension in the wrapping material to a first predetermined level, wherein the duration of time over which tension increases on the wrapping material from substantially free rotation to the first predetermined level is varied by the controller as a function of the type of wrapping material; and maintaining the tension in the wrapping material at the first predetermined level as the wrapping material wraps the bale;

wherein the first predetermined profile and the first predetermined level are a function of at least the type of the wrapping material.

19. The method of claim 18, wherein the method further comprises automatically opposing the rotation of the wrapping material roll according to a second predetermined profile to a second predetermined level as the wrapping material is severed from the wrapping material roll, wherein opposing the rotation varies the tension in the wrapping material to a second predetermined level, and the second predetermined profile and second predetermined level are functions of at least one characteristic of the wrapping material.

20. The method of claim 19, wherein an electronic controller is in operative control of opposing the rotation of the wrapping material roll, and the controller is operable to select the first and second predetermined profiles and the first and second predetermined levels from a plurality of selections based on the at least one characteristic of the wrapping material.

21. The method of claim 18, wherein a torque resistor opposes the rotation of the wrapping material roll.

22. The method of claim 18, wherein an electronic controller is in operative control of opposing the rotation of the wrapping material roll, and the controller is operable to select the first predetermined profile and the first predetermined level from a plurality of selections based on the at least one characteristic of the wrapping material.

23. The method of claim 18 wherein the first predetermined profile and the first predetermined level are adjustable by an operator input.

* * * * *